United States Patent [19]
Altman et al.

[11] Patent Number: 5,683,494
[45] Date of Patent: Nov. 4, 1997

[54] ELECTROSTATICALLY ENHANCED SEPARATOR (EES)

[75] Inventors: Ralph F. Altman, Chattanooga, Tenn.; S. Ronald Wysk, Stow, Mass.; Leo A. Smolensky, Concord, Mass.; Bruce H. Easom, Groton, Mass.

[73] Assignee: Electric Power Research Institute, Inc., Palo Alto, Calif.

[21] Appl. No.: 746,640

[22] Filed: Nov. 13, 1996

Related U.S. Application Data

[62] Division of Ser. No. 399,732, Mar. 7, 1995, Pat. No. 5,591,253.

[51] Int. Cl.$^6$ ............................................. B03C 3/15
[52] U.S. Cl. ............................. 96/55; 55/460; 96/61; 96/63; 96/96
[58] Field of Search ................ 96/61, 63, 55–58, 96/96; 95/63, 69, 70, 78; 55/454, 460, 459.1, 341.1, 361

[56] References Cited

U.S. PATENT DOCUMENTS

| | | | |
|---|---|---|---|
| 1,381,719 | 6/1921 | McGee et al. | 95/69 |
| 1,843,839 | 2/1932 | Ruder | 96/61 |
| 2,360,595 | 10/1944 | Thompson | 96/61 |
| 3,907,671 | 9/1975 | Baigas, Jr. | 55/454 X |
| 4,208,192 | 6/1980 | Quigley et al. | 96/61 X |
| 4,244,708 | 1/1981 | Bielefeldt | 55/460 X |
| 4,478,613 | 10/1984 | Brettschneider et al. | 96/61 |
| 4,689,951 | 9/1987 | Polach | 96/61 X |
| 4,735,633 | 4/1988 | Chiu | 96/61 X |
| 4,927,437 | 5/1990 | Richerson | 96/61 X |

FOREIGN PATENT DOCUMENTS

| | | | |
|---|---|---|---|
| 714367 | 7/1965 | Canada | 96/61 |
| 221644 | 5/1985 | Germany | 96/61 |

*Primary Examiner*—Richard L. Chiesa
*Attorney, Agent, or Firm*—Leonard Bloom

[57] ABSTRACT

An electrostatically enhanced separator (EES) which provides mechanical separation and electrostatic separation to yield a compact and highly efficient separation system. The EES (10) may be incorporated in a collection system as well using a conventional collection device such as a cyclone collector (32), bag filter (37) or electrostatic precipitator (38). The EES (10) includes a cylindrical-walled separation chamber (11) with an inlet passage (13), a clean flow outlet (21), and a particle outlet passage (15). The inlet passage (13) and particle outlet passage (15) are both thin elongated slits which open tangentially to the cylindrical wall of the chamber for providing a substantially flush incoming flow path dispersed lengthwise along the wall.

23 Claims, 6 Drawing Sheets

ELECTROSTATICALLY ENHANCED SEPARATOR (EES)

The present application is a divisional application of application Ser. No. 08/399,732, filed on Mar. 7, 1995 and now U.S. Pat. No. 5,591,253.

FIELD OF THE INVENTION

The present invention relates to the separation of particles from gas streams and, more particularly, to a compact high-efficiency system which incorporates an electrostatically enhanced separator ("EES") for combined electrical and mechanical particulate separation.

BACKGROUND OF THE INVENTION

Cyclones are commonly used devices for separating particles from gas streams, such as dust in stack emissions and the like. Cyclones typically admit the gas stream in such a manner that a vortex is created. As a result of centrifugal force, the entrained particles in the swirling gas stream are flung against the inner walls of the cyclone and are segregated out. The cleansed gas stream leaves the cyclone through the vortex finder while the particles are funneled into a hopper or the like.

Unfortunately, the collection efficiency of conventional cyclones is relatively low. This is especially true when there is a high percentage of fine particles in the gas stream because the resulting centrifugal forces are smaller and often insufficient to segregate the particles. Even heavier particles encounter flow turbulence and secondary flows which tend to bounce them off the cyclone walls, thereby causing re-entrainment.

Many variations in cyclone designs have been suggested to improve cyclone efficiency. These include the use of opposing acoustic agglomeration to increase particle size, water injection to reduce particle bounce off the walls, electrostatics to increase the driving force of particles to the walls, and once-through cyclone designs to eliminate secondary re-entrainment. None of these previous refinements has achieved the performance needed to make cyclone collection efficiency comparable to baghouses, electrostatic precipitators, or other counterpart devices. On the other hand, the other devices are much larger and carry higher capital costs.

There have been efforts to enhance the mechanical separation of a cyclone with electrostatics. For instance, U.S. Pat. Nos. 1,381,719 issued to McGee et al. and 2,360,595 issued to Thompson both disclose an electrostatically enhanced cyclone design. Several problems persist, however. Particles in these devices are initially distributed all over the device cross-sectional area between the discharge and collecting electrodes. In this case, fine particles situated closer to the separator core may not have enough time to reach the walls and, therefore, leave the separator together with the clean gas. Also, when the particles are quite small and their concentration in the feed stream is high, the device may experience the corona suppression problem.

Secondly, the existing electrostatically enhanced cyclones are employed as single-stage units, where ionizing and separating processes are accomplished in the same vessel. This does not allow the highest separation efficiencies and minimum power consumption to be achieved.

Third, the existing electrostatically enhanced cyclones can work as particulate collectors or separators. In the first case, secondary flows (strong toroidal vortices) significantly impair the collector performance. In the second case, the particles are extracted from the device together with some bleed flow, and complete gas/particle separation can be accomplished only if the bleed flow is treated additionally in the downstream collector. If the downstream collector efficiency is low, the efficiency of the system, which incorporates both the separator and downstream collector, is also low.

Fourth, particles on the collecting electrodes of the existing electrostatically enhanced cyclones may form an immovable particulate layer, and as a result the devices may experience back corona problems and re-entrainment of the particles in the clean stream.

It would be greatly advantageous to design an electrostatically enhanced separator without shortcomings of the existing state-of-the-art devices. This separator would be very compact and able to achieve the highest collection efficiency.

SUMMARY OF THE INVENTION

It is, therefore, an object of the present invention to provide a compact electrostatically enhanced separator (EES) having an ultra high collection efficiency.

It is another object to provide the EES where the particulate re-entrainment and corona suppression problems would be minimized or eliminated.

It is still another object to incorporate the above-described EES in a collection system using a collection device such as a bag filter or electrostatic precipitator in such a way that a high EES efficiency would predetermine the system efficiency.

In accordance with the above-described objects, the present invention provides an apparatus for separating particles from a gas stream, comprising a separation vessel having a cylindrical-walled chamber bound at opposing ends, an inlet passage for admitting a particle laden gas stream into said chamber, and a particle outlet passage for expelling a concentrated stream of particles disentrained from said gas stream. The inlet passage and particle outlet passage are both thin elongated slit-like openings directed tangentially into the cylindrical wall of the chamber to provide a substantially flush incoming flow path dispersed lengthwise along the wall. Vortex finders or permeable manifolds are suspended centrally within the separation vessel and define a clean flow path outwardly through both ends of the separation vessel. A power supply is connected between the chamber walls of the separation vessel and an electrode suspended centrally for establishing an electric potential therebetween which serves to either charge particles and repel charged particles in the separation vessel toward the wall of the chamber or, when a precharger is used, to repel charged particles towards the chamber walls. In operation, a gas stream flowing into the inlet passage, through the separation chamber, and out from the particle outlet passage creates a vortex in the separation chamber which imparts a centrifugal force on the entrained particles towards the chamber wall; and the centrifugal force is augmented by the electrostatic force to propel particles against the wall and outwardly through the outlet passage.

Various configurations of discharge electrodes, inlet passages, and outlet passages are disclosed.

In addition, a particulate evacuation outlet may be directed outwardly from the separation chamber for emptying accumulated particles therefrom.

The EES walls can be constructed of a porous material permeable for fluids and particles, and a small portion of the flow might be sucked out of the apparatus through the walls. This method, boundary-layer suction, reduces the intensity of turbulence in the apparatus and increases shear forces in the immediate proximity of the walls, allowing the wall surfaces to be kept clean.

The apparatus of the present invention may be segregated into a separate pre-charging vessel and separation vessel. The electrostatic pre-charging section can assume various geometries including a cylindrical-walled chamber bound at opposing ends, an inlet passage for admitting a particle laden gas stream into the chamber, and an outlet passage for expelling the particle laden gas stream. Once again, the inlet passage and particle outlet passage both further comprise a thin elongated slit opening tangentially to the cylindrical wall of the chamber and providing a substantially flush incoming flow path dispersed lengthwise along the wall. In addition, a discharge electrode is suspended centrally within the pre-charging vessel between the ends thereof for imparting an electrostatic charge on the particulates entrained in the outgoing gas stream. This vessel is constructed in such a way that the electrical resistivity of the particulate matter that collects on surfaces within the precharging vessel does not limit the electrical operation of this section. For example, it is well known that the electrical resistivity of the particulate matter generated by many industrial processes is temperature dependent. Therefore, selected surfaces within the precharging vessel are heated or cooled so that the resistivity of the material that collects on these surfaces has no effect on the electrical operation of the precharging vessel. A separate separation vessel is in fluid communication with the pre-charging vessel downstream therefrom The separation vessel likewise comprises a cylindrical-walled chamber bound at opposing ends, an inlet passage connected to the particle outlet passage of the pre-charging vessel for admitting the electrostatically charged particle laden gas stream into the chamber, and a particle outlet passage for expelling a concentrated stream of particulates disentrained from the gas stream. As before, the inlet passage and particle outlet passage are both thin elongated slits which open tangentially to the cylindrical wall of the chamber for providing a substantially flush incoming flow path dispersed lengthwise along the wall. Vortex finders or permeable manifolds are suspended centrally within the separation vessel between the ends thereof to establish a clean flow path outward through both ends of the separation vessel. A power supply is connected between the chamber walls of the separation vessel and the electrode for establishing an electric potential therebetween to repel charged particles in the separation vessel toward the chamber wall.

In operation, the pre-charger imparts an electrostatic charge on the particles entrained in the gas stream flowing into the inlet passage of the pre-charger, and the stream with the charged particles then flows to the separation vessel from the pre-charger vessel, creating a vortex in the separation chamber. The vortex in the separation vessel imparts a centrifugal force on the entrained particles, which is augmented by the existing electrostatic charge to propel the particles against the chamber wall and out through the particle outlet passage. The electrode in the separation vessel is constructed in such a way that it creates an intense electric field but does not create a corona discharge. A large-diameter wire or rod provides a suitable geometry. Since the separation vessel does not have a significant current flow from the high voltage element to the grounded element, the resistivity of the particulate matter will not directly affect the operation of this section. The utilization of separate charging and separation sections allows optimization of operation to a degree that the separation efficiency is greatly enhanced. This separation is also significant because it permits the separation of particles with high electrical resistivity which are produced by many industrial processes.

To decrease the concentrated flow discharged from the apparatus, a plurality of such separation vessels may be connected in series downstream of the pre-charging vessel.

The invention also contemplates collection as well as separation and, to effect this, a conventional collector such as cyclone or bag filter may be incorporated in the particulate collection system in such a way that the clean flow leaving the collectors recirculates to the EES inlet passage.

Other advantages and results of the invention are apparent from the following detailed description by way of example of the invention and from the accompanying drawings.

DETAILED DESCRIPTION OF THE PREFERRED EMBODIMENTS

Figure 1:
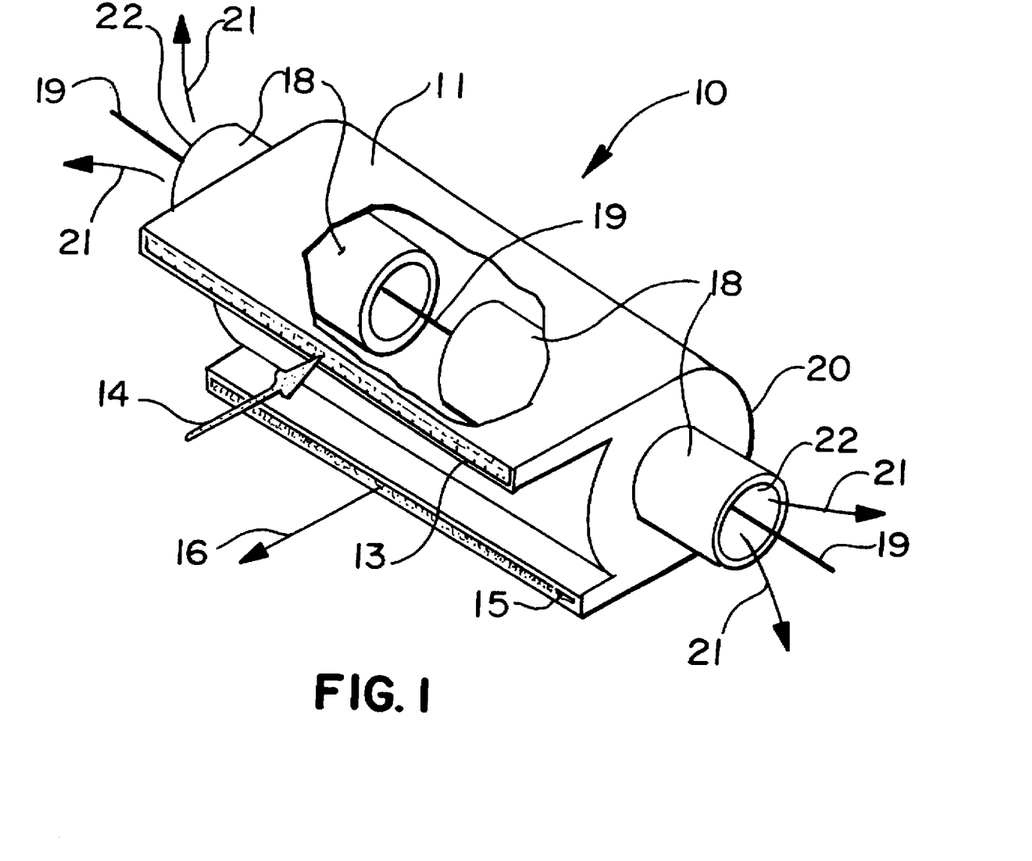
FIG. 1 is a top cut-away perspective view showing one exemplary embodiment of the electrostatically-enhanced separator ("EES") according to the present invention.
Figure 2:
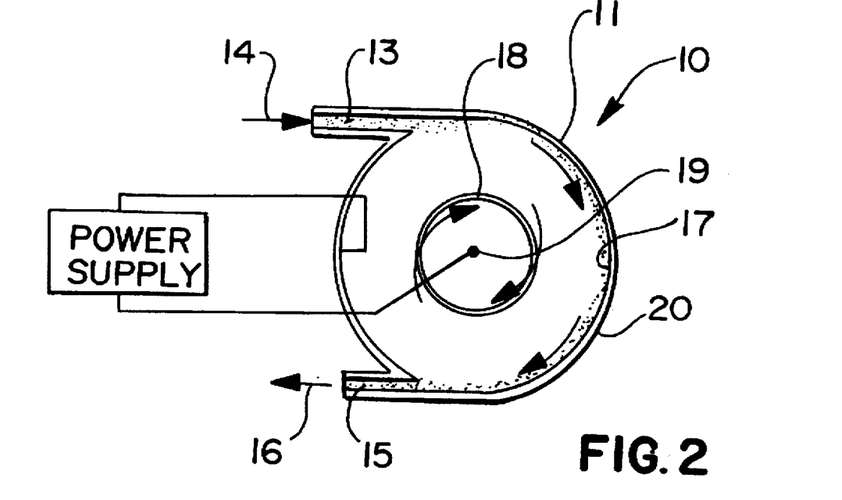
FIG. 2 is a cross-sectional view of the EES of FIG. 1 further showing a power supply connected to the EES.

With reference to FIGS. 1 and 2, the EES 10 includes a cylindrical separation vessel 11 having a thin elongated inlet passage 13 for admitting the solid particle and/or mist laden gas stream 14. The separation vessel 11 is likewise provided with a thin elongate outlet passage 15 for expelling the separated particles in the form of a concentrated "bleed flow" 16. Both the inlet passage 13 and the outlet passage 15 are in fluid communication with the separation vessel 11 and maintain a tangential fluid flow with respect to the walls 17 of the separation chamber 11. It is important that both the inlet passage 13 and outlet passage 15 are formed as narrow slits to distribute the fluid flow lengthwise between its opposing ends along the cylindrical walls of the separation vessel 11. This insures that all particulates enter and exit the separator vessel 11 proximate to the walls 17 thereof, and such proximity, first, greatly improves the separator (EES) 10 separation efficiency because the turbulent diffusion processes causing the particulate re-entrainment are less intensive in the region adjacent to the separator walls 17, and secondly, eliminates the corona suppression problem due to very low particulate concentration in the EES core.

The separator 10 further includes two vortex finders 18 which are formed as cylindrical tubes.

A discharge electrode 19 extends centrally throughout the vortex finders 18. A power supply is connected between the walls 17 of the separation vessel 11 and the discharge electrode 19 for establishing an electric potential therebetween which serves to charge the particles entrained in the separation vessel 11 and to repel charged particles toward the separation walls 17.

Gas stream 14 enters the elongate inlet passage 13 and is introduced tangentially into the separator vessel 11. This creates a vortex inside the separation vessel 11. As the particles are swirled in the separation vessel 11, the inertia of the heavier particles will propel them outward toward the wall 17 of the separation vessel 11. The particles will remain in the separator 10 for at least a 180° revolution, and will eventually be expelled from the separator 10 through the outlet passage 15. This mechanical separation is electrostatically enhanced by the discharge electrode 19. A voltage potential is applied to the discharge electrode 19 with respect to the outer walls 20 of the separation vessel 11, and this forms an electrostatic field within said vessel 11, where the particulate charging and electrostatic separation are provided. The polarity of the potential applied to the discharge electrode 19 is the same as the charge imparted on the particles. This way, the electrostatic field repels the particles and their entry into the separator core is prevented. At the same time, sanitized gas 21 is free to flow outward through the clean gas outlets 22.

The inertial separation coupled with electrostatic separation in the separation vessel 11 results in a very pure clean gas stream 21 flowing from the clean gas outlets 22. In contrast to the existing electrostatically enhanced cyclones, all particles enter and exit the separator vessel 11 proximate the separator walls 17, and particulate separation processes are accomplished in this region, where the turbulent diffusion processes are less intensive than that in the separator core. That predetermines very high EES 10 separation efficiencies.

FIGS. 3–6 illustrate alternative embodiments of the EES 10 according to the present invention.

Figure 3:
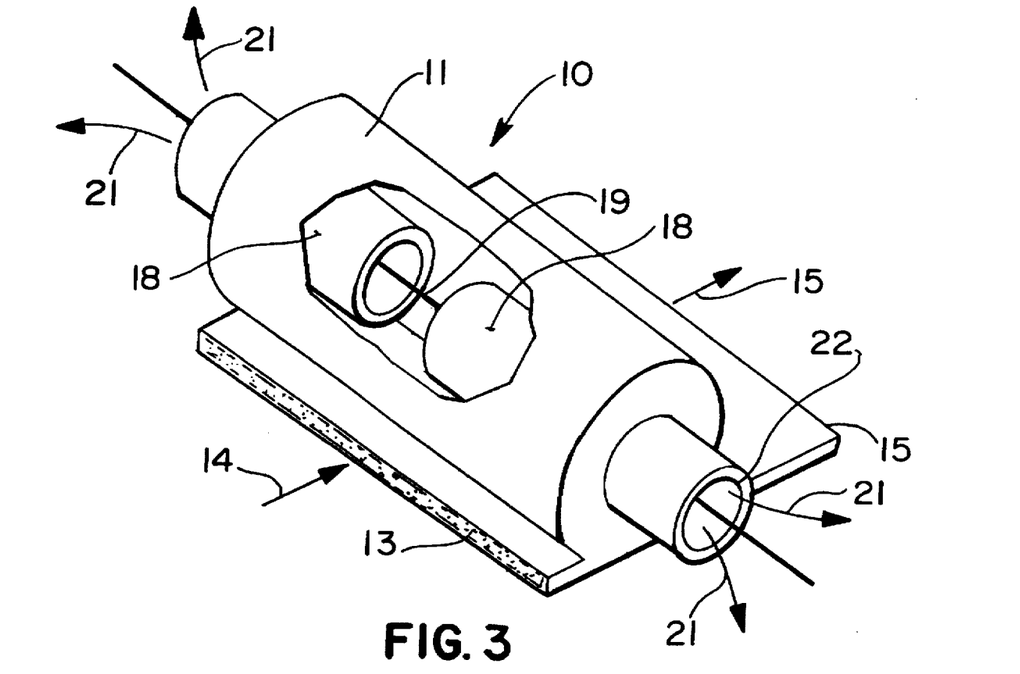
FIG. 3 is a top cut-away perspective view showing a second exemplary embodiment of the EES according to the present invention.

The embodiment of FIG. 3 is substantially the same in form and function as FIG. 1 except that the outlet passage 15 is situated in a parallel plane with the inlet passage 13.

Again, both the inlet passage 13 and the outlet passage 15 are formed as narrow slits which are distributed between the separator opposing ends along the length of the cylindrical walls of the separation vessel 11.

Figure 4:
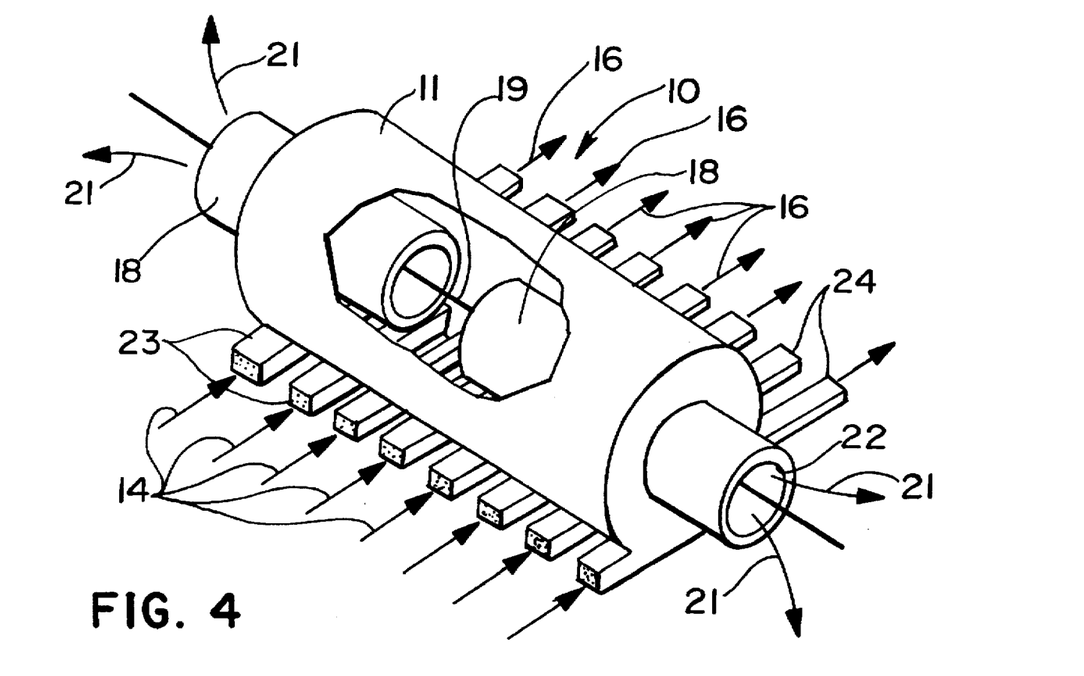
FIG. 4 is a top cut-away perspective view showing a third exemplary embodiment of the EES according to the present invention.

The embodiment of FIG. 4 is similar in form and function to that of FIG. 2 except that both the inlet passage 13 and outlet passage 15 are replaced with multiple co-planar inlet jets 23 and outlet jets 24.

The vortex finder 18 and discharge electrode 19 of the embodiments of FIG. 1 may have shapes which differ from the illustrated wire surrounded by a coaxial cylinders. For instance, known discharge electrode configurations such as rods may be used as well as scalloped bars, rods with spaced disks, barbed wires, tubes with perforated surfaces, etc.

Figure 5:
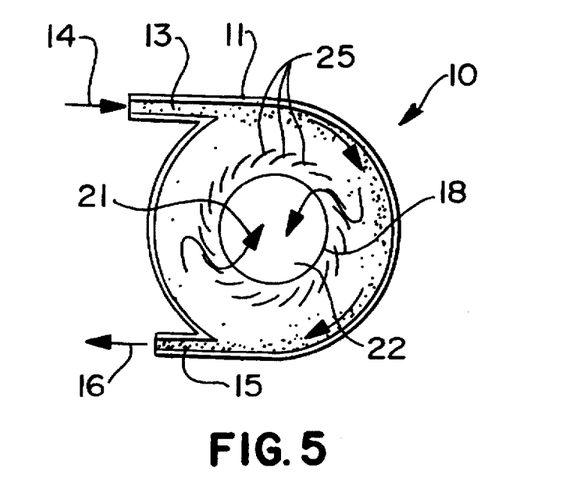
FIG. 5 is a cross-sectional view of an EES, corresponding substantially to FIG. 2, but incorporating an exemplary louver-type discharge electrode.

FIG. 5 shows an EES 10 similar to that of FIGS. 1 and 2. However, a louver-type discharge electrode 25 surrounds the clean flow outlet opening 22. The louver-type discharge electrode 25 further comprises a series of curved elongated blades equally-spaced and supported concentrically around the clean flow outlet opening 22. The blades 25 are louvered against the direction of gas flow within the separation vessel 11 to further discourage errant particulates from infiltrating the sanitized gas 21 flow.

The EES 10 of the present invention serves equally well in a wet system, and any of the above-described embodiments of FIGS. 1–5 may be deployed therein to yield equally beneficial results. In a wet system, mist or water droplets entrained in the entering gas stream 14 in FIG. 1 can result from the presence of an upstream process (for instance, a wet-limestone scrubber for removing $SO_2$), or spray nozzles located in the duct leading to the EES, or spray nozzles located directly in the inlet passage 13.

Figure 6:
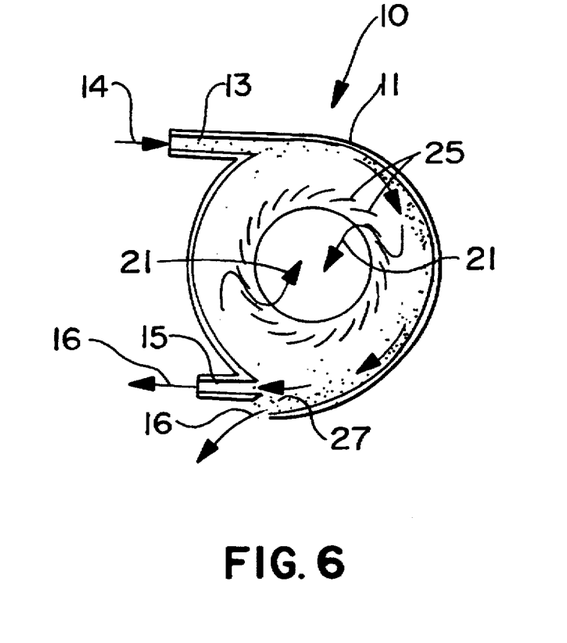
FIG. 6 is a further cross-sectional view of an EES, corresponding substantially to that of FIG. 5, but with the addition of a particulate outlet passage.

FIG. 6 shows an additional feature which helps to eradicate the particles out of the separation vessel 11. In the embodiment of FIG. 6, the particles are eradicated through particulate outlet passage 27 on the wall 17 of the separation vessel 11. The slit-type elongated particulate outlet passage 27 has a configuration similar to the outlet passage 15 and is situated upstream of the passage 15. Similar particulate outlet passages can be incorporated in any of the foregoing embodiments.

Figure 7:
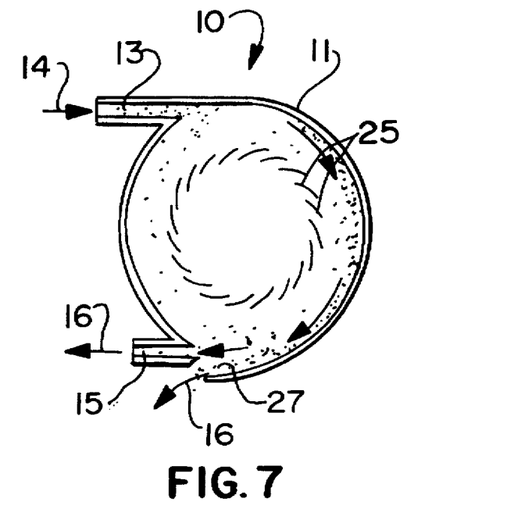
FIG. 7 is a still further side cross-sectional view of an EES, corresponding substantially to FIG. 6, but without vortex finders or permeable manifolds suspended centrally.

The embodiment in FIG. 7 differs from the embodiment in FIG. 6 in one respect only, it does not have vortex finders or permeable manifolds suspended centrally within the separation vessel 11 and used to form a clean flow path outward through both ends of the separation vessel 11. The gases and particles that are not eradicated out of the separation vessel 11 through the particulate outlet passage 27 leave the separation vessel 11 through the outlet passage 15.

Figure 8:
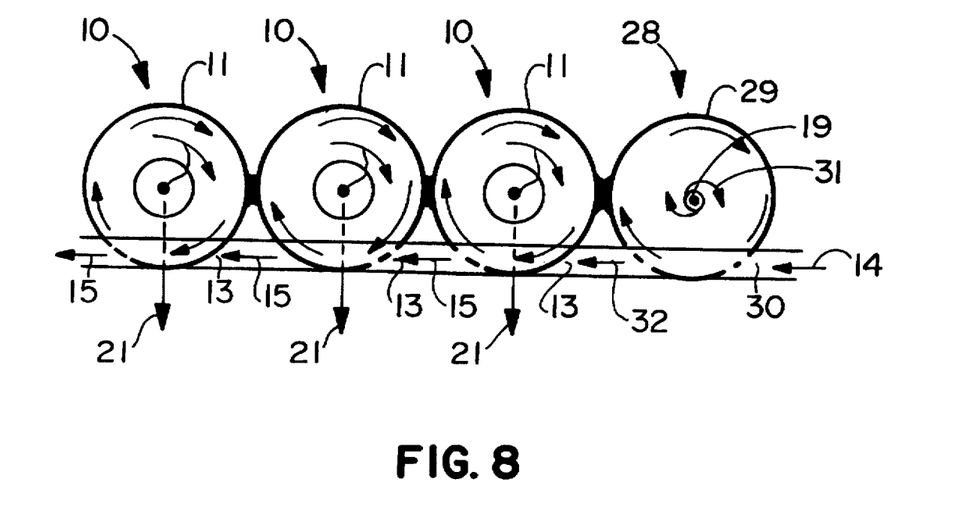
FIG. 8 is a cross-sectional view of a two-stage EES combining a dedicated ionizing unit with three individual downstream EES devices (as in FIG. 3) having outlet passages connected to succeeding inlet passages to form a series.

The EES 10 of the present invention can also be configured as a two-stage unit which allows the ionizing and separating processes to be optimized independently. For example, FIG. 8 shows a two-stage EES combining a dedicated ionizing unit 28 with three individual downstream EES devices 10 of the type shown in FIG. 3. The dedicated ionizing unit 28 is utilized to charge particles, while the EES devices 10 are used to separate the gases from particles precharged in the ionizing unit 28. The EES units 10 have outlet passages 15 connected to succeeding inlet passages 13 to form a series. The dedicated ionizing unit 28 comprises a cylindrical vessel 29 having an elongated inlet passage 30 for admitting the solid particulate and/or mist laden gas stream 14. The ionizing unit 28 is similar to the downstream EES unit 10 but it does not have a clean gas outlet 21. It does have a discharge electrode 19 positioned coaxially at the center of the ionizing vessel 29. In operation, as for one-stage embodiment of FIGS. 1–7, the particles move along the cylindrical walls of the ionizing unit 28 and the concentration of particles in the unit core remains very low. This minimizes the corona suppression effect in the initial ionizing unit 28 and imparts a maximum charge on the particulates to thereby enhance separation in the downstream EES units 10. The corona suppression effect may be further minimized by incorporating optional clean air or gas jets 31 along the ionizing unit 28 axis.

In operation, the flow 32 discharged from the upstream ionization unit 28 is fed to the inlet passage 13 of the downstream EES unit 10, and the EES separated particles are fed to the next successive EES units 10 as shown. In a dry system, the outer surface of the ionizing unit 28 can be cooled or heated to reduce the electrical resistivity of the particles which may accumulate on the surface of the walls. However, cooling is unnecessary in a wet system where the incoming gas stream is a mist.

All of the above-described EES embodiments function to separate particles from a gas stream. In order to collect the particles, the present invention may be expended to a combination of the EES unit(s) with one or more conventional collecting devices.

Figure 9:
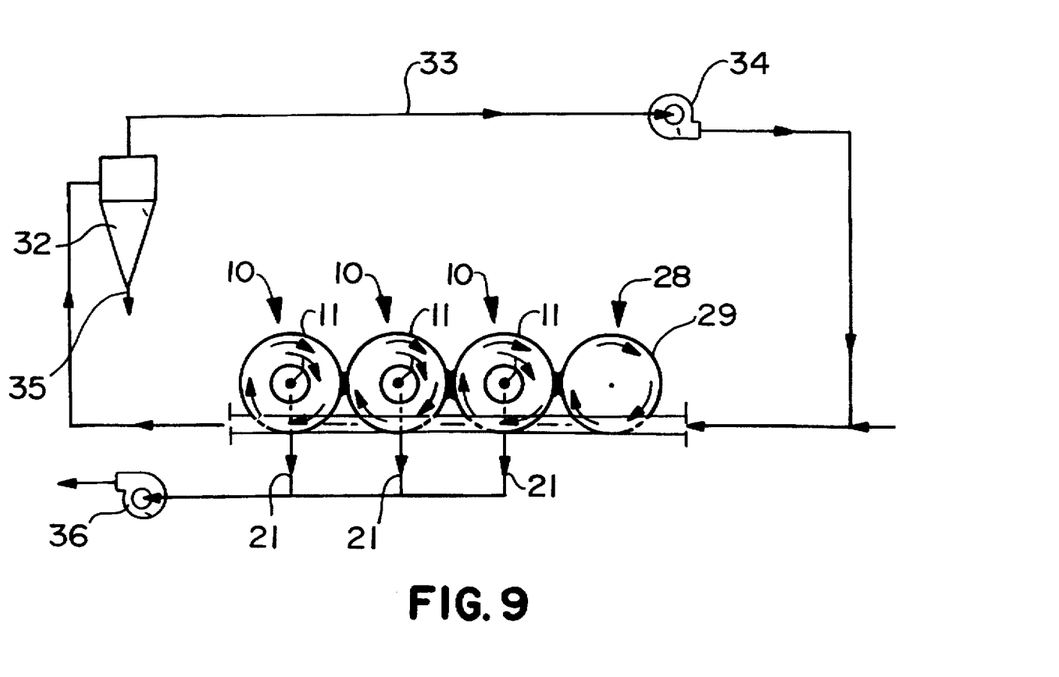
FIG. 9 is a schematic flow diagram of the two-stage EES of FIG. 8 connected in a recirculating loop with a conventional cyclone particulate collector.

For example, FIG. 9 is a combination of the two-stage EES of FIG. 8 connected in series with a conventional cyclone particulate collector 32. The cyclone collector 32 can be situated upstream or downstream of the two-stage EES. In FIG. 9, the cyclone collector 32 is illustrated downstream of the EES 10 and the "bleed flow" 33 discharged from the cyclone collector 32 is recirculated to the inlet of the EES by means of the recirculating fan 34. The clean flows 21 are output directly from the individual EES units 10. A fan 36 may be incorporated within the system to assist in moving both the recirculating flow 33 and clean flow 21. Meanwhile, the collected particles are ejected from the cyclone collector 32 at output 35.

Figure 10:
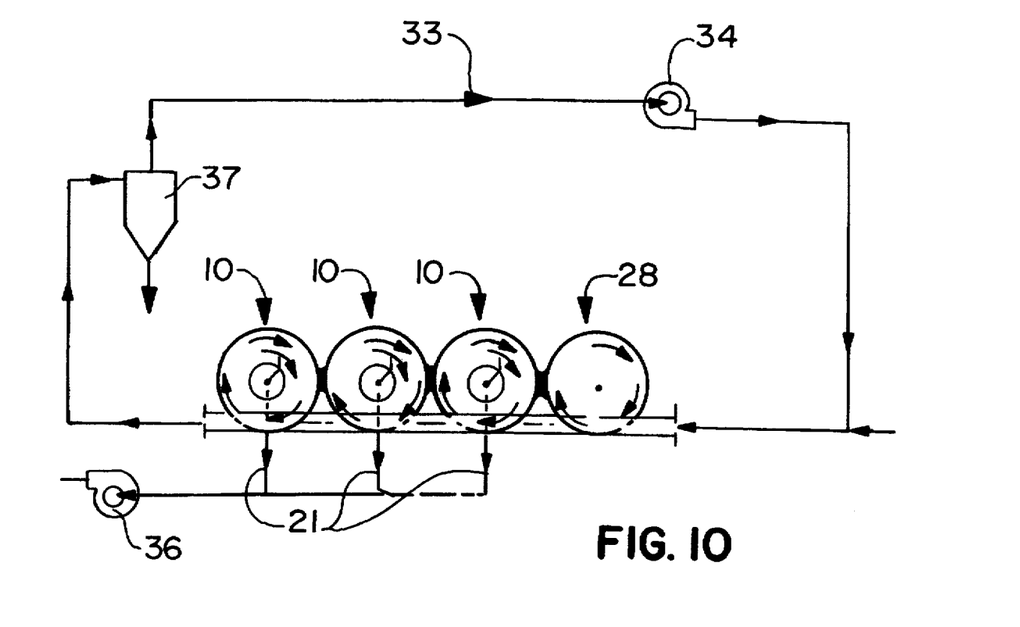
FIG. 10 is a schematic flow diagram of the two-stage EES of FIG. 8 connected in a recirculating loop with a conventional baghouse.

A similar scheme is shown in FIG. 10, however, a conventional baghouse 37 is substituted as the particulate collector component. The flow 33 through the baghouse 37 is much lower than the clean flow 21 from the EES units 10. This facilitates a more compact system in FIG. 10. As a result, the system in FIG. 10 is highly cost-effective. If a high-efficiency baghouse 37 is used, the recirculation may be unnecessary.

Figure 11:
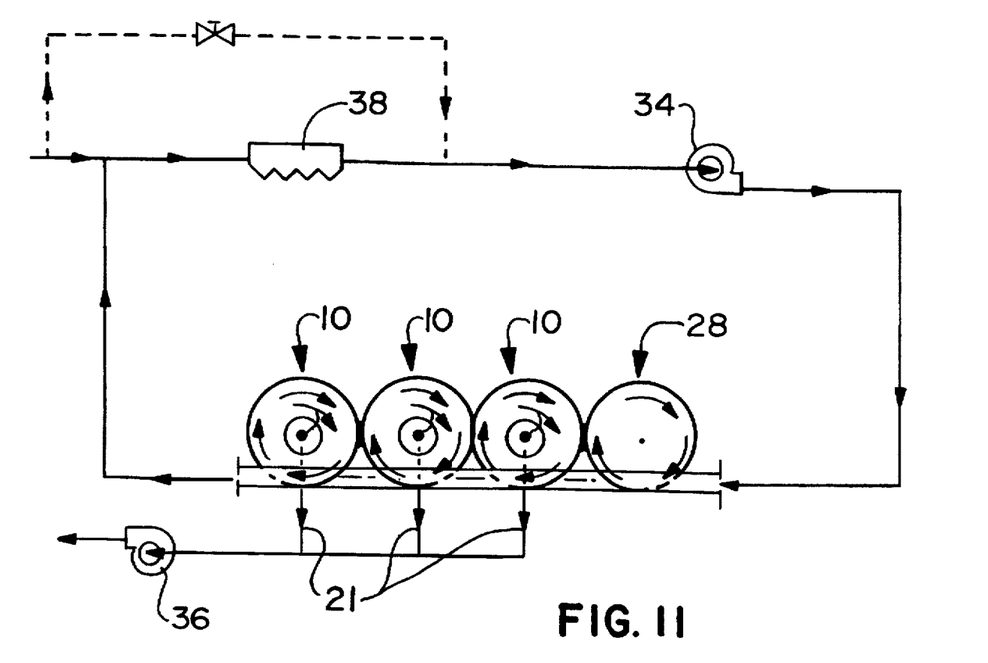
FIG. 11 is a schematic flow diagram of the two-stage EES of FIG. 8 connected in a recirculating loop with a conventional electrostatic particulate collector.

Furthermore, the EES 10 of the present invention can be retrofit in an existing electrostatic precipitator ("ESP") system. For instance, when a high collection efficiency is needed from an existing undersized ESP, then the existing ESP may be utilized as the particulate collector. As before, the ESP may be situated upstream or downstream of the EES. FIG. 11 illustrates an ESP system with the two-stage EES of FIG. 8 incorporated upstream of an ESP 38 having four electrostatic fields.

In the two-stage configuration of the EES units, the electrical forces that would tend to hold particulate matter on the outer surface are negligible, and these surfaces are continuously swept clean by the circulating gas flow in the cylinder. The electrical forces that would tend to hold the particulate matter on these surfaces arise from the effect of a current flowing through a high resistivity dust layer. There is little or no current in the separation vessel 11 and, therefore, little or no force tending to hold the particles against the wall. In the ionizing vessel 29, the walls of the vessel are heated or cooled to lower the resistivity of the particulate matter that collects on the walls to such a low value that, again, the electrical forces become negligible, and this particulate matter is easily swept from the surface by the circulating gas flow. In the single-stage configuration, the surface of the walls 17 of the separation vessel 11 can be cleaned by periodically de-energizing the discharge electrodes and closing off the clean flow 21. When the electrical forces are eliminated, the force of the recirculating flow will sweep the walls 17 of the separation vessel 11 clean.

Figure 12:
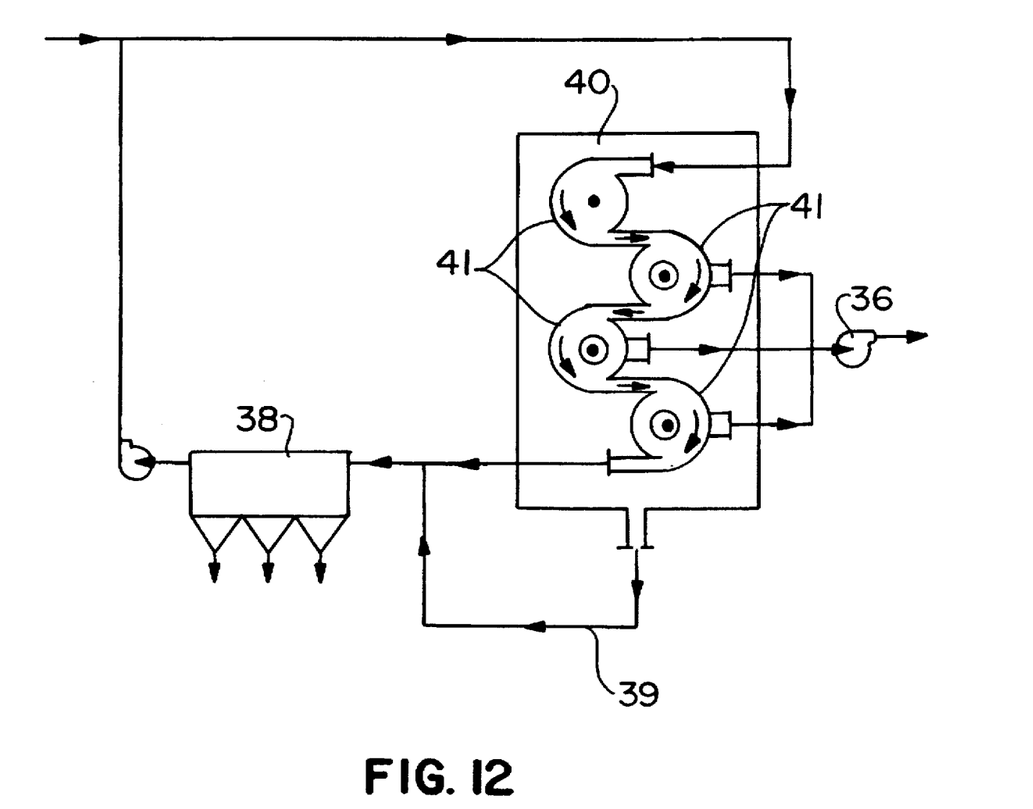
FIG. 12 is a schematic flow diagram of the two-stage EES connected in a recirculating loop with a conventional collector and having a suction flow recirculated to the EES inlet.

Another method of cleaning the walls 17 of the EES unit 10 is boundary-layer suction. Suction flow 39 in FIG. 12 is extracted from a two-stage EES 40 through its porous walls 41 permeable for fluids and particles. Said suction flow recirculates to said EES inlet.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

We claim:

1. An apparatus for separating particles from a gas stream, comprising:

a walled separation vessel having a length and opposite ends and further having a substantially cylindrical separation chamber formed therein;

respective spaced-apart inlet and outlet passages formed in the separation vessel as narrow slits extending along the full length thereof and in fluid communication with the separation chamber, such that a particulate laden gas stream is received through the inlet passage into the separation chamber tangentially to the walls of the separation vessel, such that a particulate concentrated gas stream is expelled from the separation chamber through the outlet passage tangentially to the walls of the separation vessel, and such that said particulate laden gas stream and said particulate concentrated gas stream create a vortex in the separation chamber which imparts a centrifugal force on the particles towards the walls of the separation vessel;

an outgoing clean air path at a respective at least one of said opposite ends of the separation vessel;

a discharge electrode mounted within the separation vessel; and a power supply establishing an electrostatic field between the discharge electrode and the walls of the separation vessel, such that the established electrostatic field repels the particles towards the walls of the separation vessel, thereby preventing entrance of the particles into the outgoing clean air path.

2. The apparatus of claim 1, further including a means for precharging the particles in the particulate laden gas stream prior to entering the separation vessel.

3. An apparatus for separating particles from a gas stream comprising:

a separation vessel including a cylindrical-walled separation chamber bound at opposing ends, a plurality of discrete inlet passages for admitting a particulate laden gas stream into said separation chamber and a plurality of discrete particle outlet passages for expelling a concentrated stream of particles disentrained from said gas stream, said inlet passages and particle outlet passages being evenly spaced along cylindrical walls of said separation chamber and defining a thin tangential flow path into and from said separation vessel which is substantially flush with the cylindrical wall thereof;

two vortex finders suspended centrally within the separation vessel between the ends thereof and establishing an end-to-end clean flow path through the separation vessel;

an elongated discharge electrode suspended centrally within the separation vessel between the ends thereof; and a power supply connected between the cylindrical walls of the separation chamber of the separation vessel and 
the discharge electrode for establishing an electric potential therebetween which serves to charge the particles entrained in said incoming gas stream and repel charged particles in said separation vessel toward the cylindrical walls of said separation chamber;

wherein a gas stream flowing into said inlet passages, and out from said particle outlet passages creates a vortex in said separation chamber which imparts a centrifugal force on the entrained particles toward the wall of said chamber, and said centrifugal force is augmented by said electrostatic force to propel said particles against said wall and out through said particle outlet passages.

4. The apparatus for separating particles from a gas stream according to claim 3, wherein said discharge electrode comprises a cylindrical arrangement of louvers.

5. The apparatus for separating particles from a gas stream according to claim 4, wherein said louvers are involute about a central axis.

6. The apparatus for separating particles from a gas stream according to claim 5, wherein said louvers are directed outward from said central axis and are curved in a direction opposite to said vortex.

7. The apparatus for separating particles from a gas stream according to claim 4, wherein said louvers are connected to said power supply to serve as a discharge electrode for electrostatically preventing said particles from permeating therethrough into said clean flow passage.

8. The apparatus for separating particles from a gas stream according to claim 3, wherein said inlet passages are directed parallel to said outlet passage.

9. The apparatus for separating particles from a gas stream according to claim 8, wherein said inlet passages and outlet passages are co-planar.

10. The apparatus for separating particles from a gas stream according to claim 3, wherein said separation vessel further comprises a particulate evacuation outlet directed outward from said chamber for emptying accumulated particles therefrom.

11. The apparatus for separating particles from a gas stream according to claim 3, wherein the cylindrical walls of said separation vessel are made of porous material permeable for fluids and particles and some flow is extracted from said vessel through its walls.

12. An apparatus for separating particles from a gas stream comprising:

an electrostatic pre-charging vessel, including a cylindrical-walled chamber bound at opposing ends, an inlet passage for admitting a particle laden gas stream into said chamber and an outlet passage for expelling said particle laden gas stream, said inlet passage and particle outlet passage both further comprising a thin elongated slit opening tangentially to cylindrical walls of said chamber and providing a substantially flush incoming flow path dispersed lengthwise along said cylindrical walls, and a discharge electrode suspended centrally within the pre-charging vessel between the opposing ends thereof for imparting an electrostatic charge on the particles entrained in said outgoing gas stream; and a separation vessel in fluid communication with said pre-charging vessel downstream therefrom, said separation vessel further comprising, an inlet passage connected to the particle outlet passage of said pre-charging vessel for admitting the electrostatically charged particle laden gas stream into a separation chamber, a particle outlet passage for expelling a concentrated stream of particles disentrained from said gas stream, said inlet passage and particle outlet passage both further comprising a thin elongated slit opening tangentially to said cylindrical wall of said separation chamber and providing a substantially flush incoming flow path dispersed lengthwise along said wall, two vortex finders suspended centrally within the separation vessel between the ends thereof and establishing an end-to-end outgoing clean flow path through the separation vessel and out from the ends thereof, an elongated discharge electrode suspended centrally within the separation chamber of the separation vessel and between the ends thereof, and a power supply connected between the cylindrical walls of the separation chamber of the separation vessel and the discharge electrode for establishing an electric potential therebetween to repel charged particles in said separation vessel toward the wall of said separation chamber;

wherein an electrostatically charged gas stream flowing into the inlet passage of said separation vessel from said precharging vessel creates a vortex in said separation chamber which imparts a centrifugal force on the entrained particles toward the wall of said separation chamber, and said centrifugal force is augmented by the existing electrostatic charge on said particles to propel said particles against said wall and out through said particle outlet passage.

13. The apparatus for separating particles from a gas stream according to claim 12, wherein said discharge electrode comprises a cylindrical arrangement of louvers.

14. The apparatus for separating particles from a gas stream according to claim 12, wherein said inlet passage and outlet passage of the chamber are co-planar.

15. The apparatus according to claim 12, wherein said inlet passage and outlet passage are directed along two parallel planes.

16. The apparatus for separating particles from a gas stream according to claim 12, wherein said separation vessel further comprises a particle evacuation outlet directed outward from said separation chamber for emptying accumulated particles therefrom.

17. The apparatus for separating particles from a gas stream according to claim 12, further comprising a plurality of separation vessels connected in series downstream of said pre-charging vessel.

18. The apparatus for separating particles from a gas stream according to claim 17, further comprising a cyclone collector having an input in fluid communication with the particle output of a separation vessel, and an output in fluid communication with the inlet passage of said pre-charging vessel.

19. The apparatus for separating particles from a gas stream according to claim 18, further comprising a fan connected between the output of said cyclone collector and the inlet passage of said pre-charging vessel for assisting gas flow therebetween.

20. The apparatus for separating particles from a gas stream according to claim 17, further comprising an electrostatic precipitator having an input in fluid communication with the particle output of a separation vessel, and an output in fluid communication with the inlet passage of said pre-charging vessel.

21. The apparatus for separating particles from a gas stream according to claim 20, further comprising a fan connected between the output of said electrostatic precipitator and the inlet passage of said pre-charging vessel for assisting gas flow therethrough.

22. The apparatus for separating particles from a gas stream according to claim 17, further comprising a bag filter having an input in fluid communication with the particle output of a separation vessel, and an output in fluid communication with the inlet passage of said pre-charging vessel.

23. The apparatus for separating particles from a gas stream according to claim 22, further comprising a fan connected between the output of said bag filter and the inlet passage of said pre-charging vessel for assisting gas flow therebetween.

* * * * *